United States Patent [19]

Kersey

[11] Patent Number: 5,202,747
[45] Date of Patent: Apr. 13, 1993

[54] FIBER OPTIC GYROSCOPE WITH WIDE DYNAMIC RANGE ANALOG PHASE TRACKER

[75] Inventor: Alan D. Kersey, Springfield, Va.

[73] Assignee: The United States of America as represented by the Secretary of the Navy, Washington, D.C.

[21] Appl. No.: 736,327

[22] Filed: Jul. 26, 1991

[51] Int. Cl.[5] ............................................. G01C 19/72
[52] U.S. Cl. .................................................... 356/350
[58] Field of Search ........................ 356/345, 350, 358

[56] References Cited

U.S. PATENT DOCUMENTS

| | | | |
|---|---|---|---|
| 4,286,878 | 9/1981 | Pircher. | |
| 4,637,722 | 1/1987 | Kim | 356/350 |
| 4,702,601 | 10/1987 | Schroder. | |
| 4,717,256 | 1/1988 | Ensley et al. | |
| 4,759,629 | 7/1988 | Everest et al. | 356/350 |
| 4,765,739 | 8/1988 | Koizumi et al. | |
| 4,825,261 | 4/1989 | Schroeder. | |
| 4,874,244 | 10/1989 | Kersey | 356/350 |
| 4,969,017 | 11/1990 | Lefevre et al. | 356/350 |

FOREIGN PATENT DOCUMENTS 0080512  4/1987  Japan .................................. 356/350

Primary Examiner—Samuel A. Turner
Attorney, Agent, or Firm—Thomas E. McDonnell; George Jameson

[57] ABSTRACT

A simple analog phase tracking circuit used with an open-loop fiber gyroscope is disclosed that imitates the operation of a true closed-loop gyroscope, by electronically generating a sinusoidal output which nulls the Sagnac phase shift. The nulling or tracking technique is based on the generation of sine and cosine dependent interferometric outputs from an open-loop gyroscope using dynamic phase modulation. Cross-multiplication of the outputs with electronically generated phase shift components and combining these signals obtained from the cross multiplication process produces a component which is dependent on the difference between the Sagnac phase shift and the electronically generated phase. By controlling the electronic phase shift, the output can be nulled. In this way, the phase tracking approach imitates the operation of a true closed-loop gyroscope and uses the simple structure of open-loop gyroscope. The scheme has a wide dynamic range, relatively low drift and short term noise. The analog phase tracker significantly increases dynamic range, as a large number of $2\pi$ phase excursions could be accommodated with digital tracking. The electronics are very simple and are low in cost.

17 Claims, 6 Drawing Sheets

PHASE TRACKER OUTPUT, $V_r$

FIBER OPTIC GYROSCOPE WITH WIDE DYNAMIC RANGE ANALOG PHASE TRACKER

BACKGROUND OF THE INVENTION

1. Field of the Invention

The present invention relates generally to an analog phase tracking circuit for use with interferometric fiber sensors and, more particularly, to an analog phase tracker for use with a fiber optic gyroscope for providing a linear output over a wide dynamic range (greater than ±500° Sagnac phase shift) with good linearity and low noise and drift.

2. Description of the Related Art

Optical fiber based interferometric techniques have been investigated for use in rotation sensing for over a decade because of their usefulness in navigation applications. One of the chief goals of fiber optic gyroscope development is to isolate all environmental effects other than rotation from optical fiber sensors. A fiber gyroscope configuration which accomplishes this goal is the fiber Sagnac or ring interferometer, more commonly referred to as an interferometric fiber optic gyroscope.

There are two different types of Sagnac interferometers: open-loop and closed-loop gyroscopes. Both of these interferometer configurations produce a Sagnac effect and a corresponding Sagnac phase shift which is the basis for measuring rotation of optical fiber sensors.

One of the best advantages of using an open-loop gyroscope configuration is that for medium performance applications, such as short distance airline flights or missile guidance systems, the optics and demodulation technique are low in cost. Open-loop gyroscopes perform well in less-demanding applications, where the minimum detectable rotation may be approximately 1° to 10°/hour and linearity approximately 0.1 to 1%. The disadvantages to using the open-loop gyroscope is its limited dynamic range and the need for scale factor parameter correction (a dynamic range of 3000 to 10,000 with a scale factor correction of 1 to 3% would be typical). Another disadvantage is that the scale factor which relates the output voltage to rotation rate depends directly on the source intensity and fringe visibility. Therefore the output has to be normalized to eliminate bias and scale facto drift.

In contrast to the open-loop gyroscopes, closed-loop gyroscopes are capable of measuring rotation rates with high linearity and wide dynamic range. Basically, the optical components of a closed-loop gyroscope introduce a nonreciprocal phase shift to compensate for the Sagnac phase shift caused by rotation. This is accomplished by phase shifting optically only one of the beams relative to the other beam to compensate or cancel the Sagnac phase shift. The magnitude of the Sagnac phase shift, even when multiplies of $2\pi$ are considered, could be compensated by the closed-loop gyroscope. Limited dynamic range is irrelevant because a signal is being fed-back which compensates for the Sagnac phase shift. However, to modulate one beam and not the other requires very sophisticated and costly signal processing systems and optics, which is the greatest disadvantage of the closed-loop gyroscope.

SUMMARY OF THE INVENTION

It is an object of the present invention to perform closed-loop signal processing electronically with an open-loop gyroscope configuration.

It is an object of the present invention to provide an analog phase tracker or demodulator which overcomes the limitations imposed on an open-loop fiber gyroscope.

It is also an object of the present invention to provide an analog phase tracker which has a linear output over a wide dynamic range.

It is another object of the present invention to provide an analog phase tracker where the linear output has relatively low noise and drift.

It is a further object of the present invention to provide an analog phase tracker for a low-cost medium grade fiber gyroscope.

It is also an object of the present invention to provide an analog phase tracker which can be produced at low cost.

It is another object of the present invention to provide an analog phase tracker for medium-grade, wide dynamic range gyroscope systems.

Instead of optically compensating for the Sagnac phase shift as performed in the closed-loop gyroscope, the Sagnac phase shift is permitted to occur in the open-loop gyroscope but is nulled by using electronic signal processing. The electronics are very simple, low cost parts.

The electronics comprise an analog phase tracking circuit which uses analog trigonometric function generators to track a Sagnac induced phase shift. The tracking technique is based on the generation of sine and cosine dependent interferometric outputs from an open-loop gyroscope using dynamic phase modulation. Cross-multiplication of the outputs with electronically generated phase-conjugate components and combining the signals obtained in this cross multiplication process produces a component which is dependent on the difference between the Sagnac phase shift and the electronically generated phase. By controlling the electronic phase shift, the output can be nulled. In this way, the phase tracking approach imitates the operation of a true closed-loop gyroscope and uses the simple structure of an open-loop gyroscope.

Other features and advantages of the present invention will be set forth in, or apparent from, the detailed description of preferred embodiments of the present invention which follows.

DESCRIPTION OF THE PREFERRED EMBODIMENTS

Figure 1:
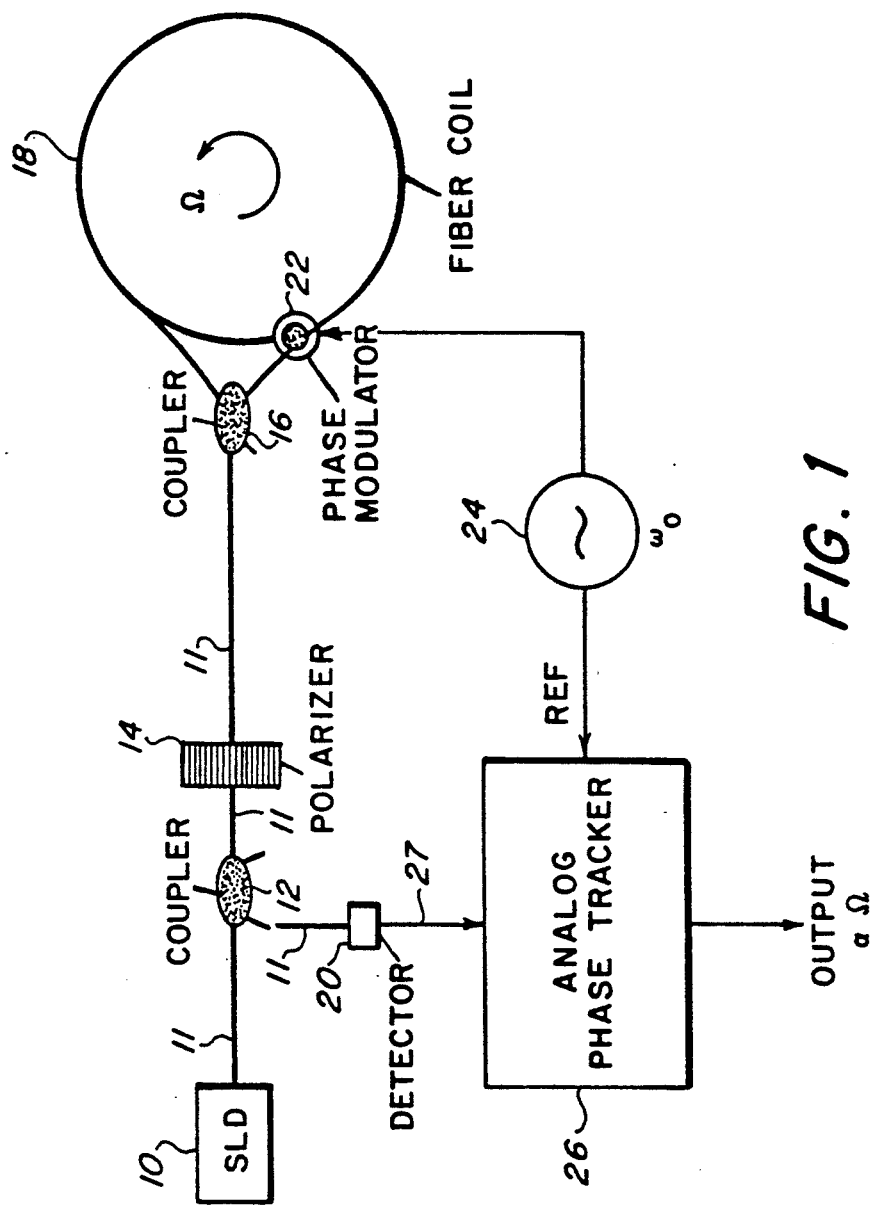
FIG. 1 is a basic configuration of the open-loop gyroscope with electronic closed-loop (phase tracking) operation according to the present invention.

The preferred embodiment of the analog phase tracker for a gyroscope of the present invention is shown in FIG. 1. The optics shown in FIG. 1 are the same components used for the open-loop gyroscope or the minimum configuration for a reciprocal fiber optic gyroscope. The optical components of this system comprise a super-luminescent diode (SLD) 10, fiber optic cable 11, couplers 12 and 16, polarizer 14, a fiber optic coil or fiber loop 18 which has radius R and N turns and photodetector 20. All these optical components are conventional and well known in the art. The optical components produce a Sagnac phase shift when the gyroscope is rotating. The electronics comprise a conventional piezoelectric transducer or a phase modulator 22, an oscillator 24 and an analog phase tracker 26. These electronic components comprise a basic form of signal processing or demodulation that can be used with the fiber optic gyroscope to measure a Sagnac phase shift. The electronics produce a signal dependent only on the rotation of the gyroscope and optical loss.

The super-luminescent diode (SLD) 10 or an equivalent optical source generates a light beam which passes through coupler 12 and polarizer 14 by fiber optic cable 11. Coupler 16 splits the beam of light into two beams of light which pass through the fiber coil 18 in opposite directions. One of the beams of light travels clockwise around the fiber optic loop 18 while the other beam of light propagates counter-clockwise in the optical fiber loop 18. The gyroscope rotates at a rate $\Omega$ in the counter-clockwise direction in this example, but can also rotate in the clockwise direction.

A time varying phase modulation $\Delta\phi \sin(\omega_o t)$ is applied via the conventional piezoelectric transducer 22 located in the fiber loop 18, where $\Delta\phi$ represents the phase modulation index. Conventional oscillator 24 generates the fundamental harmonic $\omega_o$ which is applied to the phase modulator 22 and as a reference signal $\omega_{ref}$ to the analog phase tracker 26. Coupler 16 mixes the counterpropagating beams of light to produce a mixed beam. This mixed beam is coupled out of the fiber optic coil 18 by wa of the reciprocal port of coupler 16, and passes through polarizer 14 and coupler 12 by way of the fiber optic cable 11 to be sensed at photodetector 20.

In a rotating frame of reference, the Sagnac effect results in the effective optical path length through the loop of the fiber loop 18 increasing for one beam and decreasing for the other beam. The resultant phase shift between the two optical components at the output of photodetector 20 is given by:

$$2\phi_s = \frac{4\pi RL\Omega}{\lambda_o c} \quad (1)$$

where R is the radius of the fiber coil, L is the total length of fiber in the loop, $\lambda_o$ is the wavelength of the source radiation, c is the velocity of light, $\Omega$ is the rotation rate of the fiber optic gyroscope, and $2\phi_s$ is the resultant Sagnac phase shift.

Equation (1) can also be represented as $2\phi_s = K_o\Omega$, where $K_o$ equals an optical scale factor. The optical scale factor $K_o$ is a proportionality constant used to relate rotation rate $\Omega$ to Sagnac phase shift $2\phi_s$. $K_o$ is constant because the radius R of the fiber loop 18 and the length L of the fiber loop 18 are set for each application while both the wavelength $\lambda_o$ of the source 10 and the velocity of light (c) are known constants.

A device using an optical source having a wavelength $\lambda_o$ of approximately 1 $\mu$m, a 1,000 turn fiber coil, having a ten centimeter radius (R) and a length (L) of one kilometer, rotating at 1°/hour would produce a Sagnac phase shift of approximately $10^{-5}$ radians. Consequently, measurement of rotation rates of a gyroscope on the order of 0.01°/hr. requires a phase shift detection sensitivity of approximately $10^{-7}$ radians, or a relative change in optical path length of the fiber coil of one part in $10^{17}$. To achieve this high degree of accuracy, the two paths experienced by the two optical beams must be identical when the gyroscope is in a non-rotating frame. In other words, the system must exhibit reciprocity, where the counterpropagating beams of light traverse identical optical paths.

Sagnac phase shifts are very minute phase shifts, for example $10^{-7}$ radians in the above example. To measure such extremely small Sagnac phase shifts from a small rotation rate of a Sagnac interferometer, the gyroscope must have very high stability. The key to achieving high stability in the Sagnac ring interferometer is to have a reciprocal path. The system as shown in FIG. 1 does have high stability because that system does have a reciprocal path. As shown in FIG. 1, reciprocity is achieved by the use of coupler 12 and polarizer 14 to create the reciprocal path which leads to photodetector 20. Polarizer 14 is needed because the fiber coil 18 can support two polarization modes. The polarizer 14 therefore ensures that single spatial mode, single polarization mode operation is achieved to satisfy the requirements for reciprocity in the fiber loop 18.

The intensity output I of the Sagnac gyroscope detected at detector 20 is a cosine interference function of the form:

$$I = \frac{1}{4} I_o\alpha[1 + k\cos(\phi_{nr} + 2\phi_s)] \quad (2)$$

where $I_o$ is the source intensity, $\alpha$ is a factor accounting for optical loss, k is fringe visibility, $\phi_{nr}$ is a nonreciprocal phase shift, and $2\phi_s$ is the rotation induced Sagnac phase. For a reciprocal system, $\phi_{nr}=0$ and the cosine interference function is only dependent on the Sagnac phase shift. Moreover, the sensitivity to Sagnac shift $\partial I/\partial(2\phi_s)=0$. However, if $\phi_{nr}=\pi/2$, the sensitivity of the Sagnac interferometer is maximized. In other words, a conventional open-loop gyroscope generates a non-linear response due to measuring the phase shift at the top of the cosine interference fringe. There is inadequate sensitivity to small rotation rates because the slope is close to zero. If the phase was shifted by 90° or $\pi/2$, the interference fringe would have the highest slope and therefore the highest sensitivity to a very small change to phase.

To introduce this nonreciprocal phase shift and maximize the sensitivity of the Sagnac interferometer, dynamic phase biasing is used as shown in FIG. 1. The electronic components that provide the phase biasing include the phase modulator 22 and the oscillator 24. The oscillator 24 shown in FIG. 1 provides a time-varying modulation to the phase modulator 22. The dynamic phase biasing technique induces a phase difference between the counterpropagating beams of light where the phase difference is modulated by oscillator 24 at frequency $\omega_o$.

The phase modulator 22 inserted into the fiber optic coil 18 is a piezoelectric transducer. Part of the fiber coil 18 is wound around the phase modulator 22. When a voltage is applied to the transducer, the dimensions of the transducer change due to a piezoelectric effect. The piezoelectric effect causes a strain on the transducer which in turns causes the fiber coil to stretch. This stretching changes the length of the fiber optic coil 18. If the strain is applied sinusoidally, changes in the optical path length also occur sinusoidally.

With the gyroscope in a stationary frame, the time varying nonreciprocal phase bias modulates the interferometer output symmetrically over the cosine interferometer transfer function described by equation (2). In a rotating frame, however, the Sagnac phase shift introduces an offset which causes an asymmetric output modulation.

The optimum modulation frequency $\omega_o$ is known as the 'proper' or 'eigenfrequency' of the loop. The proper frequency is given by $\omega_o = \pi/\tau$, where $\tau$ is the propagation time for light through the fiber coil.

Oscillator 24 generates the fundamental frequency $\omega_o$ which is applied to the phase modulator 22 and as a reference signal $\omega_{ref}$ to the analog phase tracker 26. The photodetected output detected at detector 20 can then be expressed as:

$$= \tfrac{1}{4} \eta I_o \alpha [1 + k \cos(2\phi_s + \Delta\phi \sin(\omega_o t))], \quad (3)$$

where $\eta$ is the detector efficiency (Watts/Amp). Equation 3 can be expanded in terms of harmonics of $\omega_o$, to yield the full expansion of the photodetected signal:

$$= \tfrac{1}{4} \eta I_o \alpha \Bigg[ 1 + \qquad (4)$$
$$k \bigg[ J_0(\Delta\phi) + 2 \sum_{n=1}^{\infty} J_{2n}(\Delta\phi)\cos(2n\omega_o t) \bigg][\cos(2\phi_s)] +$$
$$k \bigg[ 2 \sum_{n=1}^{\infty} J_{(2n+1)}(\Delta\phi)\sin((2n+1)\omega_o t) \bigg][\sin(2\phi_s)] \Bigg]$$

where the $J_0(\Delta\phi)$, $J_{2n}(\Delta\phi)$ and $J_{(2n+1)}(\Delta\phi)$ terms are Bessel functions. Equation (4) represents a series of even and odd harmonics in the output. Synchronously detecting the amplitudes of the component in the interferometer output at the fundamental ($\omega_o$) and the second harmonic ($2\omega_o$) of the piezoelectric fiber stretcher modulation frequency produces signals given by $$S_1 = -\tfrac{1}{2} \eta I_o \alpha k J_1(\Delta\phi)\sin(2\phi_s), \quad (5.a)$$

$$S_2 = \tfrac{1}{2} \eta I_o \alpha k J_2(\Delta\phi)\cos(2\phi_s), \quad (5.b)$$

For a phase modulation index $\Delta\phi$ equal to 2.6 radians, $J_2(\Delta\phi) = J_1(\Delta\phi)$, and the coefficients of the sine and cosine dependent gyroscope outputs in the above expression become equal. This produces the same peak amplitude of $S_1$ and $S_2$ where the sine and cosine components are equal. $S_1$ represents the amplitude of a signal at the fundamental frequency $\omega_o$. $S_2$ represents the amplitude of the signal at the second harmonic $2\omega_o$. If the gyroscope outputs are then multiplied by sine and cosine components of an electronically generated phase shift, $\Psi$, (i.e., $\sin\Psi$, $\cos\Psi$) and differentially combined according to the expression:

$$S_o = S_1 \cos\Psi - S_2 \sin\Psi \quad (6)$$

which according to the trigonometric identity:

$$\sin(x)\cos(y) - \cos(x)\sin(y) = \sin(x-y) \quad (7)$$

and from equation (6) gives a signal:

$$S_o = \tfrac{1}{2} \eta I_o \alpha k J_1(\Delta\phi)\sin[2\phi_s - \Psi] \quad (8)$$

This is the form of the signal generated by true closed-loop gyroscope configurations, where the phase $\Psi$ is optically introduced in the fiber loop to directly null the Sagnac phase shift. As discussed above, however, in the system described here, the output of equation (8) is electronically synthesized, using the outputs of an open-loop gyroscope by the analog phase tracker 26. By using $S_o$ as an error signal in a control loop configured to maintain $\Psi = 2\phi_s$, the output $S_o$ can be nulled, and the Sagnac phase shift, and thus the rotation rate, can be read via $\Psi$. With the system held in a null using feedback control of $\Psi$, the pre-factor, $[\tfrac{1}{2}\eta I_o \alpha k J_1(\Delta\phi)]$ in equation (8) affects only the gain-bandwidth product of the feedback loop. Thus, to a first order approximation, source intensity $I_o$ and fringe visibility fluctuations k do not affect the measured Sagnac phase shift, as found in true closed-loop gyroscope systems.

The analog phase tracker 26 receives a signal having a phase shift representative of an optically phase modulated interferometric output from the detector 20 via a wire 27. The signal on one side of detector 20 is optical while the signal on the other side is electronic.

Figure 2:
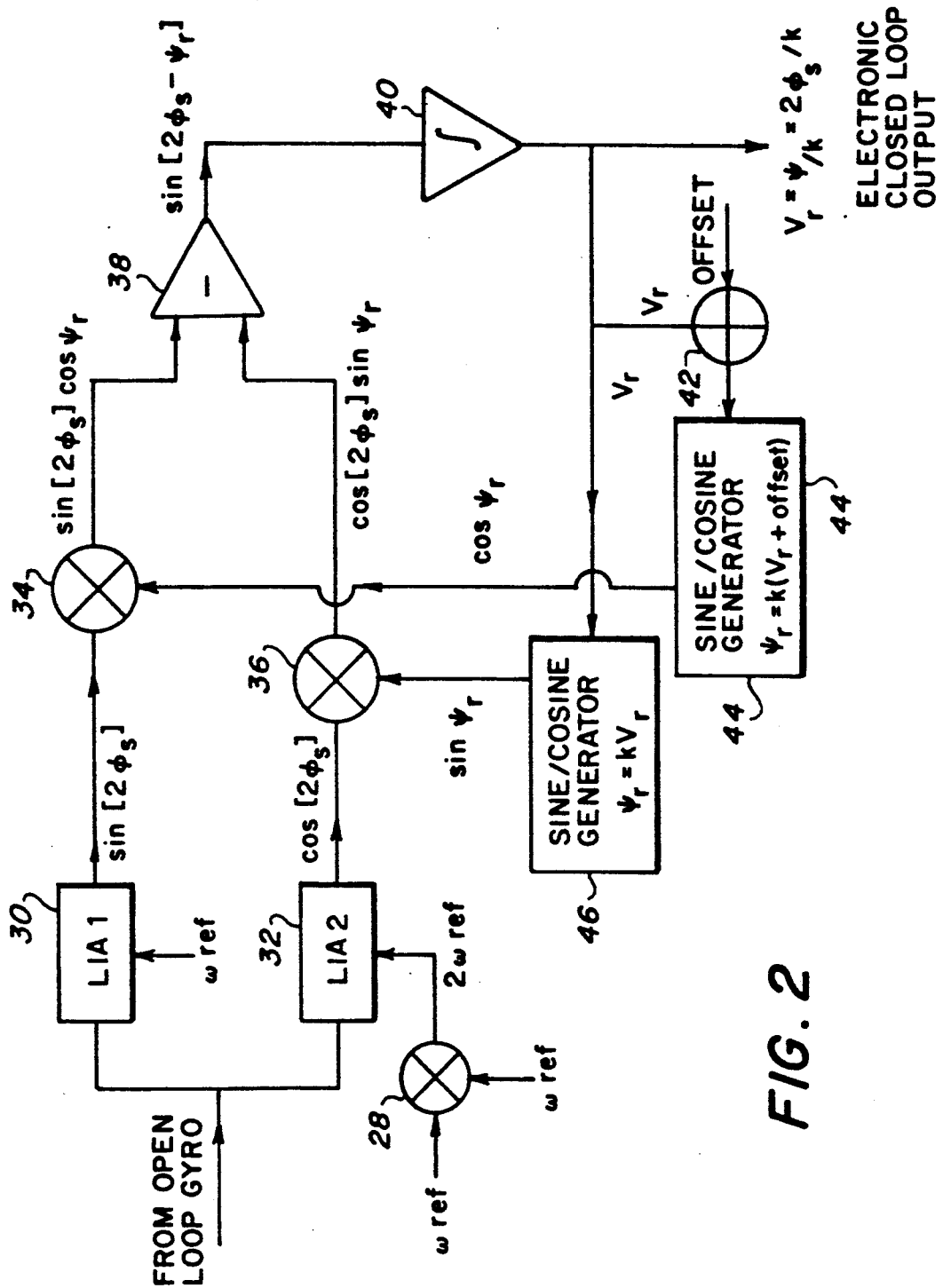
FIG. 2 is a schematic diagram of the phase tracker electronics according to the present invention.

The electronic closed-loop synthesis performed upon the outputs of the open-loop gyroscope are accomplished by the electronics shown in FIG. 2. The output detected at the nonreciprocal output port by detector 20 is sent to conventional lock-in amplifiers 30 and 32. Lock-in amplifier 30 is controlled by a first harmonic $\omega_{ref}$ reference signal, obtained from oscillator 24, to produce a $\sin[2\phi_s]$ signal. The lock-in amplifier 32 is controlled by a second harmonic $2\omega_{ref}$ reference signal, derived from the reference signal $\omega_{ref}$ developed by oscillator 24, to produce a $\cos[2\phi_s]$ signal. The second harmonic $2\omega_{ref}$ is provided by a conventional multiplier 28 which multiplies $\omega_{ref}$ by itself. The signal $\sin[2\phi_s]$ is multiplied by a $\cos[\Psi_r]$ signal by a conventional multiplier 34 to produce a signal having the equation $\sin[2\phi_s]\cos[\Psi_r]$. Similarly, the $\cos[2\phi_s]$ signal is multiplied by a $\sin[\Psi_r]$ signal by a conventional multiplier 36 to produce a signal given by $\cos[2\phi_s]\sin[\Psi_r]$. Both of the signals from the multipliers 34 and 36 are provided to a conventional differential amplifier 38 to produce a signal of $\sin[2\phi_s - \Psi_r]$.

The output from differential amplifier 38 is equivalent to $S_o$ of equation (8). This output is integrated by a conventional integrator 40 to produce the voltage $V_r$ to control sine/cosine generators 44 and 46. The output is the difference between the Sagnac phase shift and the electronically generated phase. Sine/cosine generator 46 uses output voltage $V_r$ to produce the electronically generated $\sin[\Psi_r]$ signal. Sine/cosine generator 44 generates the $\cos[\Psi_r]$ signal from the $(V_r+\text{offset})$ signal which is provided from a conventional adder 42. Offset is dependent on the generators used which is 1.8 volts in the following example to generate a 90° phase shift.

The output from integrator 40 is the electronic synthesized closed loop output which is $V_r$. This signal $V_r$ is fed back to control the phase of the sine and cosine generators 44 and 46. With the feedback loop closed, the signal $S_o$ of equation (8) is nulled and the phase adjust output $V_r$ provides a direct linear measurement of the Sagnac phase shift. $V_r$ is equal to $\Psi/k$, and $2\phi_s/k$. This output is also directly proportional to $\Omega$.

A test of the present invention has been performed using an open-loop gyroscope comprising 1 kilometer of polarization maintaining (PM) fiber wound in a 16 centimeter radius coil, PM fiber couplers and a fiber polarizer and using the components shown in FIG. 1. The results of the test are shown in FIGS. 3–6. The source used was a 0.83 $\mu$m super-luminescent diode (SLD) with an output power of approximately 1 milliwatt in a single mode pigtail. Phase modulation was applied via the piezoelectric transducer 22 located at one end of the fiber optic coil 18. A pair of lock-in-amplifiers 30, 32 were used to monitor the amplitudes of the components at $\omega_{ref}$ and $2\omega_{ref}$ in the optical signal detected at the output of the coupler 12 of the gyroscope. The phase tracker was constructed using simple low-cost trigonometric function generators 44 and 46 (Analog Devices AD 639) which have an operational range of $\pm 550°$ (approximately $\pm 3\pi$ radians), and a voltage to phase coefficient k of 50°/volt (1.8 volts = 90°). The Analog Device AD 639 costs under $50.

Figure 3:
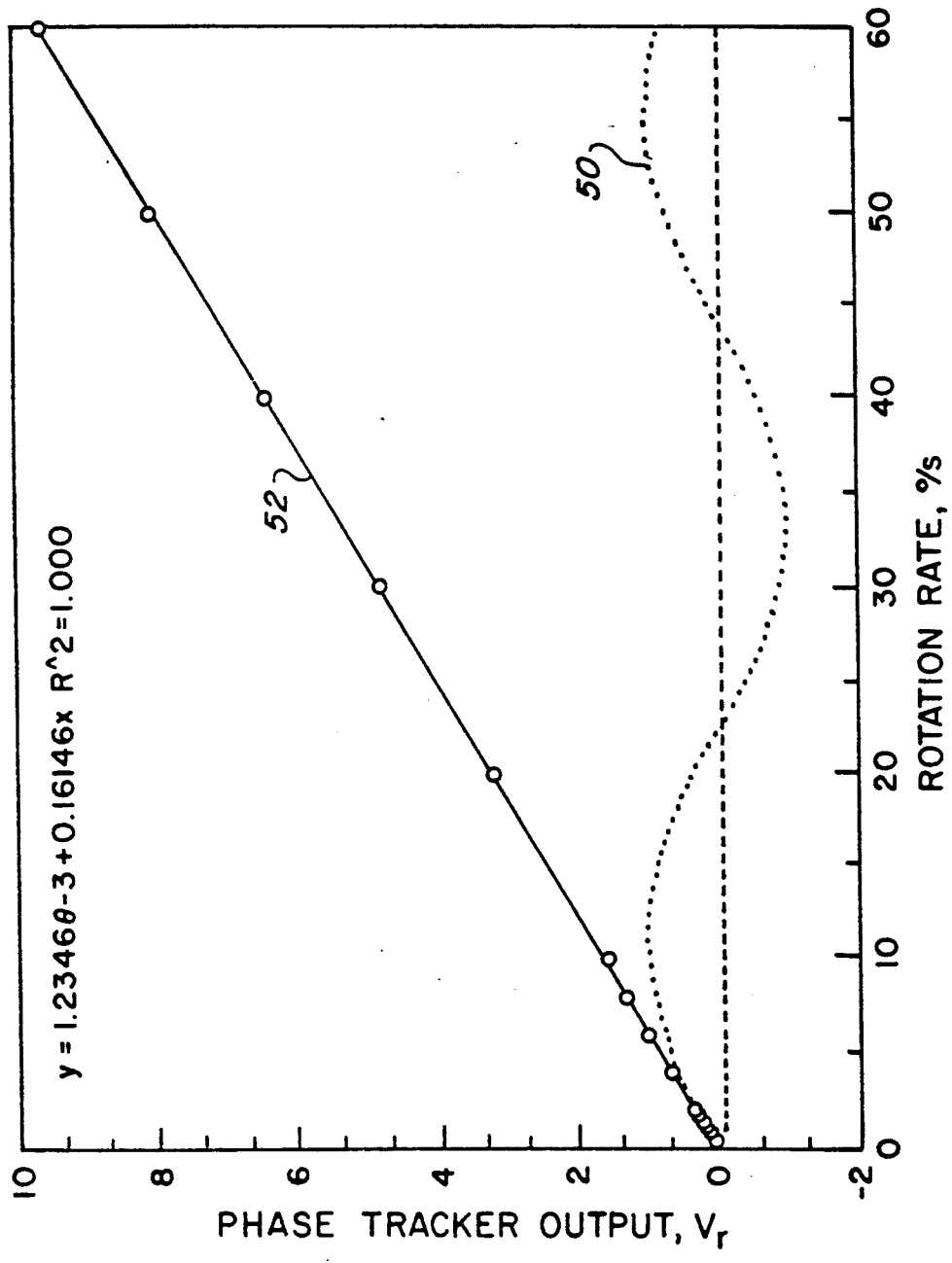
FIG. 3 shows a linear output for operation of the gyroscope phase tracker for rotation rates from 2°/second to 60°/second according to the present invention.

For the gyroscope used, a rotation rate of 11°/sec was sufficient to induce a Sagnac phase shift $2\phi_s = \pi/2$. The limit of the device in the normal open-loop mode would typically be limited to Sagnac phase shifts of less than 0.5 radians corresponding to rotation rates of a few degrees per second (i.e. less than 3°/second). The limited linear range provided by this output is shown in FIG. 3 (illustrated by function curve 50). The operation of the phase tracker at high rotation rates from 2° to 60°/second, corresponding to a Sagnac phase shift of 0.286 to approximately 8.5 radians, is shown in FIG. 3 as linear line 52. This line represents the voltage $V_r$ output from integrator 40 shown in FIG. 2. The circles shown on line 52 represent measurements of the feedback voltage that control the electronic phase term of the sine/cosine generators 44 and 46. FIG. 3 clearly illustrates that the analog phase tracker 26 provides for a near twenty fold increase in the upper sensing limit.

Figure 4:
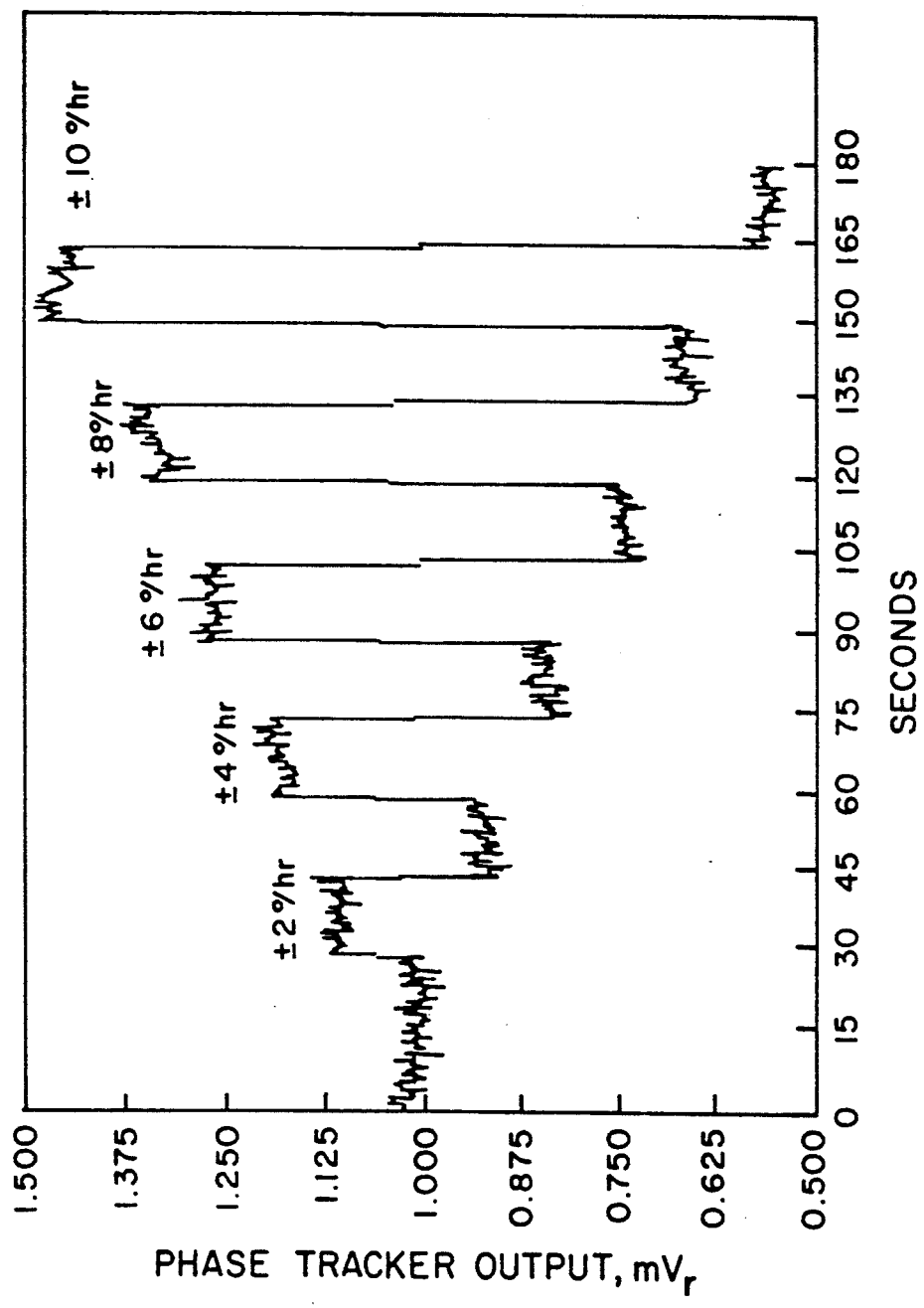
FIG. 4 shows low rotation rate sensitivity of the phase tracker of the present invention.

Low rotation rate sensitivity of the tested device (2°/hr to 10°/hr) is shown in FIG. 4. The short term noise, normalized to a 1 second time constant corresponds to a level of approximately 0.2°/hr rms. This is close to that measured with the gyroscope operating in a conventional open-loop mode, thereby suggesting that the noise of the analog phase tracker 26 is not the limit to this measurement. Therefore, the fundamental noise is due to a limitation of the optic components rather than the electronics or the analog phase tracker 26 in particular.

Figure 5:
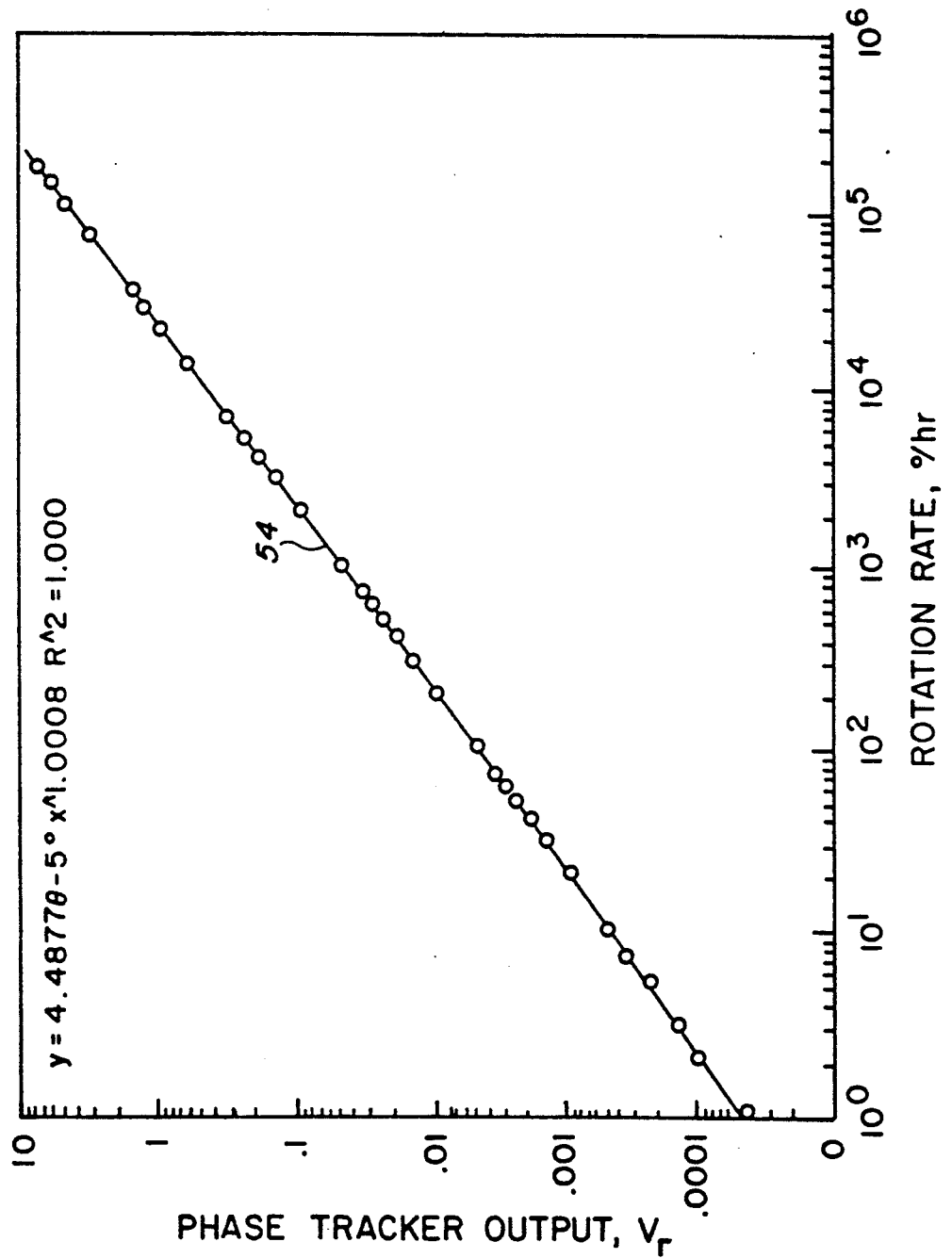
FIG. 5 shows phase tracker output over a range of $10^5$ for rotation rates of 1°/hour to 50°/second of the present invention.

FIG. 5 shows the phase tracker output of the tested gyroscope over a $10^5$ range of rotation rates. This figure indicates the excellent linearity of the tracking scheme provided by the analog phase tracker 26. The circles on line 54 represent measurements of the feed-back voltage $V_r$ that controls the electronic phase term $\Psi_r$ generated by the sine/cosine generators 44 and 46.

Figure 6:
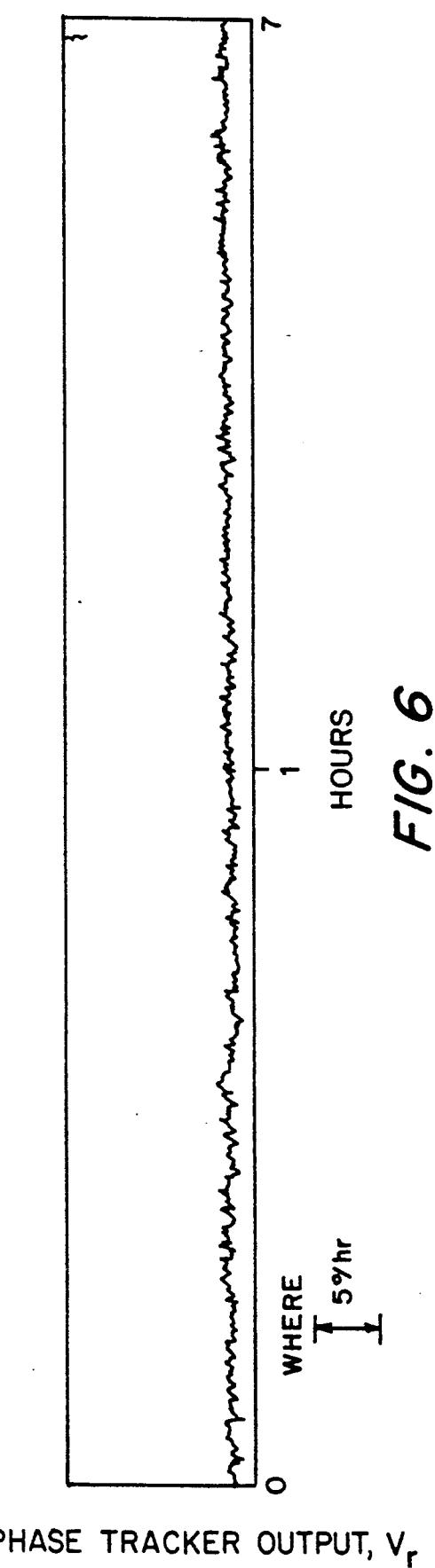
FIG. 6 show bias drift in degrees of the gyroscope over a two hour period for the present invention.

The drift of the gyroscope over a two hour period is shown in FIG. 6. A change of 5°/hr is also represented in FIG. 6. The bias uncertainty or deviation is better than 1°/hour demonstrating good drift characteristics for medium-type performance applications.

The phase tracker can be used with the fiber gyroscope. However, the phase tracker can be used with any interferometric fiber sensor system such as Mach-Zender interferometers. This has the limitation of requiring resets due to phase drifts which are usually common in interferometric systems such as the fiber Mach-Zehnder. The sine/cosine components can also be generated by using look-up tables or a computer rather than using the sine/cosine generators AD 639s. If the sine/cosine component is adjustable beyond the $\pm 500°$ Sagnac phase shift limitation of the current AD 639, then the linear range of analog phase tracker would also extend beyond the rotation rates given above for the tests conducted using the AD 639s.

What is claimed is:

1. An analog phase tracker, comprising:
   means for receiving a first signal having a phase shift representative of an optically phase modulated interferometric output; and
   means for electronically nulling the phase shift to provide an electronic phase tracking signal.

2. An analog phase tracker as recited in claim 1, wherein said electronically nulling means includes:
   means for generating first and second phase compensating signals based on the electronic phase tracking signal.

3. An analog phase tracker as recited in claim 1, wherein said electronically nulling means includes:
   means for generating a sine waveform phase compensating signal based on the electronic phase tracking signal; and
   means for generating a cosine waveform phase compensating signal based on the electronic phase tracking signal.

4. An analog phase tracker as recited in claim 2, wherein said electronically nulling means further includes:
   first means responsive to the first signal and to first and second reference signals for providing a sine waveform phase shifted signal and a cosine waveform phase shifted signal;
   means for multiplying the sine waveform and cosine waveform phase shifted signals by the first and second phase compensating signals respectively to provide cross-multiplied second and third signals;
   means for providing a phase difference signal based on a difference between the cross-multiplied second and third signals; and
   means for integrating the phase difference signal to provide the electronic phase tracking signal.

5. An analog phase tracker as recited in claim 4, wherein said first means comprises first and second lock-in amplifiers for respectively providing the sine and cosine waveform phase shifted signals.

6. An analog phase tracker as recited in claim 2, wherein said generating means includes:
   a cosine generator to generate the first phase compensating signal based on the electronic phase tracking signal; and
   a sine generator to generate the second phase compensating signal based on the electronic phase tracking signal.

7. An apparatus, comprising:
   optical means for generating a first signal having a phase shift based on optical interference between first and second beams of light produced by said optical means; and
   electronic means for electronically nulling the phase shift of the first signal to provide an electronic phase tracking signal.

8. An apparatus as recited in claim 7, wherein said optical means comprises:
- an optical source for providing a first beam of light;
- a fiber optic coil having first and second ends;
- means for splitting the first beam of light into the second and third beams of light and for injecting the second beam of light into the first end of said fiber optic coil and the third beam of light into the second end of said fiber optic coil;
- polarizing means for polarizing the first, second and third beams of light;
- photodetector means for providing the first signal based on optical interference between the second and third beams of light; and
- means for passing the first beam of light to said polarizing means and for passing the second and third beams of light to said photodetector means.

9. An apparatus as recited in claim 8, wherein said electronic means comprises:
- oscillation means for providing a frequency signal;
- phase modulation means for modulating the second and third beams of light according to the frequency signal provided by said oscillation means; and
- analog phase tracking means responsive to the first signal and the frequency signal for nulling said phase shift to provide the electronic phase tracking signal based on the electronically nulling of the phase shift.

10. An apparatus as recited in claim 8, wherein said optical source is a diode light source.

11. An apparatus which detects and electronically nulls a phase shift, comprising:
- an optical source for providing a first beam of light;
- a fiber optic coil having first and second ends;
- first means for splitting the first beam of light into second and third beams of light and for injecting the second beam of light into the first end of said fiber optic coil and the third beam of light into the second end of said fiber optic coil;
- oscillation means for providing a frequency signal;
- phase modulation means for modulating the second and third beams of light according to the frequency signal provided by said oscillation means;
- polarizing means for polarizing the first, second and third beams of light;
- photodetector means for providing a first signal having the phase shift based on optical interference between the modulated second and third beams of light;
- second means for passing the first beam of light to said polarizing means and for passing the second and third beams of light to said photodetector means; and
- analog phase tracking means responsive to the first signal and the frequency signal for electronically nulling the phase shift of the first signal to provide a phase tracking signal based on the electronic nulling of the phase shift.

12. An apparatus as recited in claim 11, wherein said analog phase tracking means comprises:
- means for generating first and second phase compensating signals based on the phase tracking signal.

13. An apparatus as recited in claim 12, wherein said analog phase tracking means further comprises:
- means responsive to the first signal and the frequency signal for providing a sine waveform phase shifted signal and a cosine waveform phase shifted signal;
- means for multiplying the sine and cosine waveform phase shifted signals by the first and second phase compensating signals respectively to provide first and second cross-multiplied signals;
- means for providing a phase difference signal based on a difference between the first and second cross-multiplied signals; and
- means for integrating the phase difference signal to provide the phase tracking signal.

14. An apparatus as recited in claim 11, wherein each of said first and second means is a coupler.

15. An apparatus as recited in claim 11, wherein said phase modulation means is a piezoelectric transducer.

16. An apparatus as recited in claim 11, wherein said optical source is a diode light source.

17. An apparatus which detects and electronically nulls a phase shift, comprising:
- a laser diode which produces a first beam of light;
- a fiber optic coil having first and second ends;
- a first coupler, coupled to said fiber optic coil; which splits the first beam of light into second and third beams of light and which injects the second beam of light into the first end of said fiber optic coil and the third beam of light into the second end of said fiber optic coil;
- an oscillator which provides a frequency signal;
- a phase modulator coupled to said fiber optic coil and to said oscillator, and which modulates the second and third beams of light responsive to the frequency signal provided by said oscillator;
- a polarizer coupled to said first coupler and which polarizes the first, second and third beams of light;
- a photodetector which provides a first signal based on optical interference between the modulated second and third beams of light;
- a second coupler, coupled to said laser diode, said polarizer and said photodetector, which passes the first beam of light to said polarizer and which passes the second and third beams of light to said photodetector; and
- an analog phase tracker, connected to said photodetector and said oscillator, which receives the first signal and the frequency signal, electronically nulls the phase shift between the second and third beams of light and provides an electronic phase tracking signal responsive to the electronic nulling of the phase shift.

* * * * *